J. W. ANDERSON.
MULTIPLE VIEW CAMERA.
APPLICATION FILED OCT. 3, 1917.
1,287,816.
Patented Dec. 17, 1918.
2 SHEETS—SHEET 1.
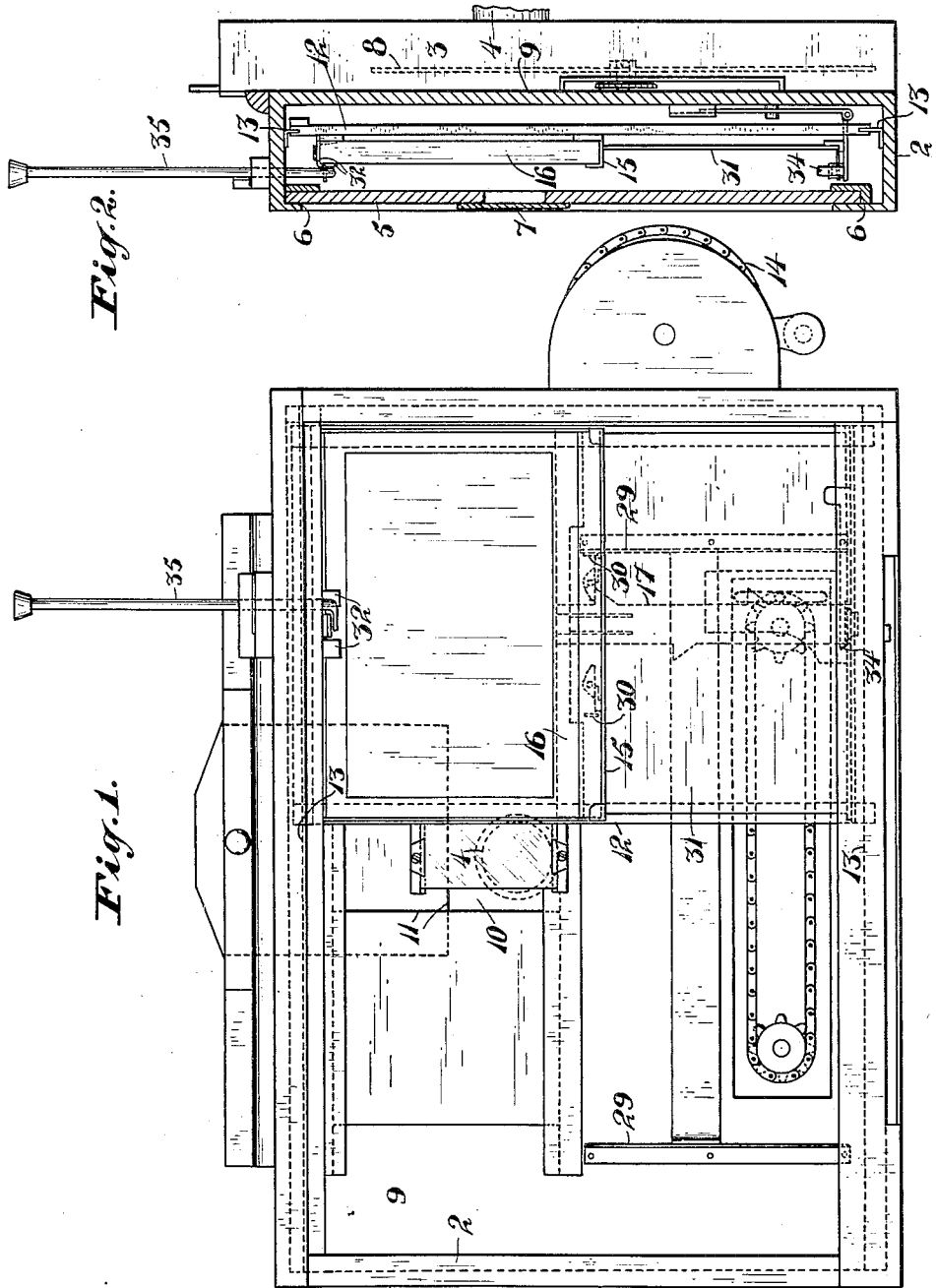
WITNESS:
F. C. Fliedner
J. H. Herring
INVENTOR.
James W. Anderson
BY
Strong & Townsend
ATTORNEYS.

J. W. ANDERSON.
MULTIPLE VIEW CAMERA.
APPLICATION FILED OCT. 3, 1917.

1,287,816.

Patented Dec. 17, 1918.
2 SHEETS—SHEET 2.

WITNESS:
F. C. Fliedner
J. H. Herring

INVENTOR.
James W. Anderson
BY
Strong & Townsend
ATTORNEYS.

UNITED STATES PATENT OFFICE.

JAMES W. ANDERSON, OF SAN FRANCISCO, CALIFORNIA, ASSIGNOR TO ANDERSON MANUFACTURING CO., OF SAN FRANCISCO, CALIFORNIA, A CORPORATION OF CALIFORNIA.

MULTIPLE-VIEW CAMERA.

1,287,816.  Specification of Letters Patent.  Patented Dec. 17, 1918.

Application filed October 3, 1917. Serial No. 194,604.

*To all whom it may concern:*

Be it known that I, JAMES W. ANDERSON, a citizen of the United States, residing at the city and county of San Francisco and State of California, have invented new and useful Improvements in Multiple-View Cameras, of which the following is a specification.

This invention relates to multiple view cameras of the type shown in my Patent No. 1,158,019, dated October 26th, 1915.

In the above mentioned patent I employed an escapement mechanism for regulating the extent of falling movement of the plate holder comprising a toothed bar carried upon the plate holder and coöperating with a detent on a horizontal rod carried by the reciprocating frame. Each time it was desired to remove the plate holder for reloading it, the operator was compelled to detach the detent carrying bar and the escapement mechanism in its entirety was then removed with the plate holder. Moreover, the teeth on the bar were not adjustable and in order to obtain different divisions of the plate other bars had to be substituted. In the present invention I employ escapement mechanism comprising a toothed bar detachably carried upon the reciprocating frame and disconnected entirely from the plate holder, being positioned at the front thereof, and detent mechanism for coöperation with the toothed bar carried on the lower edge of the plate holder. The toothed bar remains in place when the plate holder is removed and thereby the operation of reloading is facilitated. Also I provide a bar having adjustable teeth to permit any desired division of the plate to be made. Other changes and improvements will become apparent upon a further understanding of the invention.

In the accompanying drawings, Figure 1 shows a rear elevation of a camera embodying my invention, the back side of the housing being removed.

Fig. 2 shows a vertical cross sectional view of the same.

Figure 3:
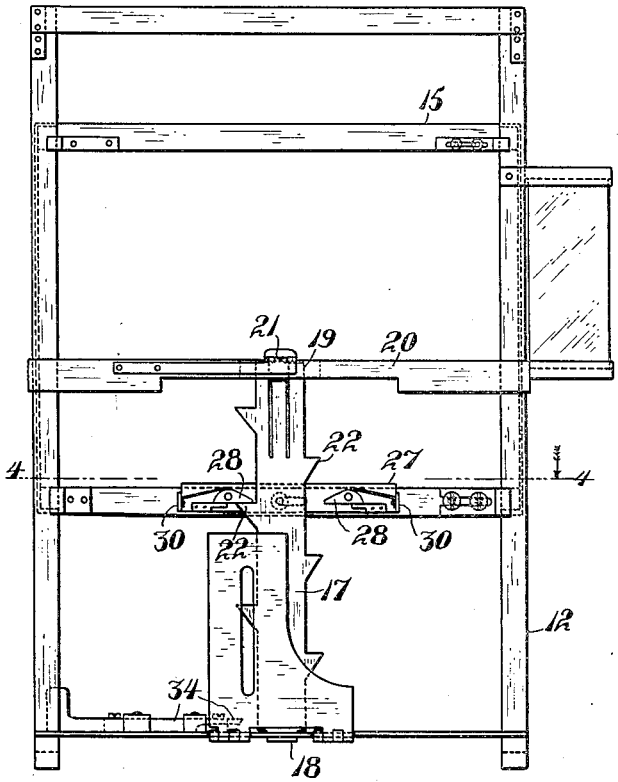
Fig. 3 shows a front elevation of the carriage frame and associated parts including one form of toothed rack.

The camera as shown in Figs. 1 and 2 comprises a suitable box or casing 2 having a front 3 to which is attached a lens 4 or other suitable camera apparatus. A removable back 5 is slidable in guides 6 and has a focusing aperture or window normally closed by a slide 7. Within the box behind the lens is a rotary shutter 8 through which light may pass intermittently from the lens to a sensitized plate at the rear thereof. The shutter is preferably journaled upon a shaft secured to a vertical wall or partition 9 in the box, said wall dividing the box longitudinally. Formed in said wall is an aperture 10, the size of which is controlled by means of adjustable members 11. Immediately in the rear of the partition wall 9 is a reciprocating carriage mechanism comprising a frame 12 slidable on horizontal rails or guides 13 at the top and bottom of the housing and operated by suitable driving mechanism 14 connected to the rotary shutter. A vertically slidable frame 15 is carried by the frame 12 and removably receives a plate holder 16. The vertical dimension of the plate holder frame is such that it may be elevated bodily to the upper portion of the carriage frame so that the bottom edge of the sensitized plate within the holder becomes approximately even with the bottom of the aperture 10 in the wall 9.

At the front of the carriage frame is a vertical toothed rack 17 detachably held thereon by means of a projection 18 at the lower end entering an aperture in the bottom of the frame and a bifurcated upper end 19 entering a slot in a horizontal bar 20 fixed upon the carriage frame intermediate the top and bottom thereof. A spring clip 21 on said horizontal bar serves to hold the toothed rack in place.

Figures 6, 7:
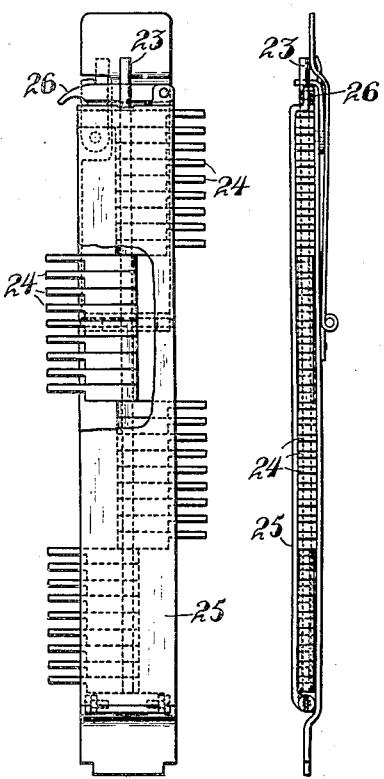
Fig. 6 shows a front elevation of another form of toothed bar wherein the teeth are adjustable.
Fig. 7 shows an edge view of the same.
Figure 4:
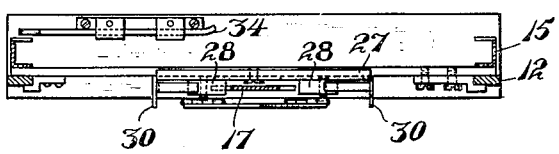
Fig. 4 shows a plan sectional view of the same taken on the line 4—4 of Fig. 3.
Figure 5:
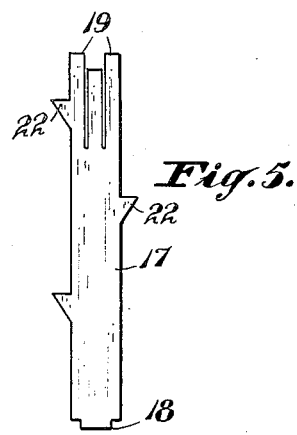
Fig. 5 shows a detached view of one form of toothed bar employed in the escapement mechanism.

The bar is shown in two forms. In Figs. 3 and 5 it has teeth 22 formed integral with the body and extending in staggered relation at opposite edges thereof. In Figs. 6 and 7 it has a rod 23 on which a bank of teeth 24 are pivoted to swing to either side and project beyond the edges of the bar. A face plate 25 hinged at the lower end to the bar and held flat against the teeth by means of a fastener 26 at the top serves to maintain the teeth rigidly in position at one side or other of the bar. When the cover plate is unlatched the teeth can be adjusted as desired to position any number on one side or the other whereby to determine the distance which the plate holder will be lowered at each end of the movement of the carriage.

The plate holder of the frame 15 has on its lower portion a slidable bar 27 carrying at each end an inwardly directed pivoted detent 28. These detents are positioned on opposite sides of the toothed bar 17 and are pivoted and spring-pressed so as to yield in a downward direction and allow the plate holder and frame to be moved upwardly, but are rigid in the opposite direction to hold said plate holder and frame against downward movement except as the escapement mechanism permits. The spacing of the detents is equal to the width of the bar and one tooth, and at opposite ends of the movement of the carriage frame is a flange 29 fixed to the partition wall 9 and which is engaged by a lug 30 on the slidable bar 27, whereby the latter is shifted in a direction to release one of the detents from its tooth and allow the plate holder and frame to drop downwardly until the detent on the opposite side strikes a tooth.

Slidable over the front of the plate holder so as to effectually cover the sensitized plate within is a slide 31 which may be locked in closed position by a suitable catch 32. The plate holder with the slide in place is placed within the frame 15 and fastened therein by means of catch 32, and thereafter the carriage mechanism is moved to the left-hand side of the housing where the slide is locked by means of a catch 34 in position on the carriage frame. A lifting rod 35 projects downwardly through the top of the housing and is normally positioned so as to be engaged by the catch 32 on the plate holder when the carriage mechanism is moved to the left and thereby this engages said catch so that the plate holder will be free to move upwardly independently of the slide. The said lifting rod has a hook-shaped lower end to engage beneath the catch 32 for this purpose. When the plate holder has been raised to its upward limit of movement it will be held in position by means of the toothed bar 17 and detents 28. Thereafter as the catch mechanism is reciprocated through suitable operating mechanism the plate holder will be successively lowered from tooth to tooth through the escapement mechanism already described. On account of the detachability of the toothed rack 17 other racks having a different number of teeth may be readily substituted whereby to divide the sensitized plate into different spacings for the accommodation of a greater or less number of horizontal rows of exposures.

Ordinarily the camera is sold with one or more racks of the type shown in Figs. 3 and 5 in place thereon, but where special conditions require a great variety of divisions of the plate the toothed rack shown in Figs. 6 and 7 is furnished as an additional part of the mechanism. The teeth on this rack are capable of a variety of adjustments to provide any desired spacing of the plate in its downward movement.

Various changes in the construction and arrangement of the several parts herein shown and described may be employed without departing from the spirit of my invention as disclosed in the appended claims.

Having thus described my invention, what I claim and desire to secure by Letters Patent is—

1. In a multiple view camera, a reciprocating carriage frame, a supplemental frame on the carriage frame slidable vertically thereon, a holder carrying a sensitized plate detachably received by said supplemental frame and insertible at the rear thereof, and escapement mechanism movable with the holder and for retaining said plate holder in raised position and permitting intermittent movement of the same in a downward direction, said escapement mechanism being arranged in its entirety in front of the vertically slidable frame and entirely disconnected from the plate holder, whereby the latter may be inserted and removed without disturbing the same.

2. In a multiple view camera, a reciprocating carriage frame, a supplemental frame on the carriage frame slidable vertically thereon, a holder carrying a sensitized plate detachably received by said supplemental frame and insertible at the rear thereof, escapement mechanism for retaining said plate holder in raised position and permitting intermittent movement of the same in a downward direction, said escapement mechanism being arranged in its entirety in front of the vertically slidable frame and entirely disconnected from the plate holder, whereby the latter may be inserted and removed without disturbing the same, said escapement mechanism including a toothed bar arranged on the carriage frame and detent mechanism carried by the supplemental frame, and means for actuating said detent mechanism at each end of movement of the carriage to allow the plate holder and the supplemental frame to move downwardly the distance of one tooth on the bar.

3. In a multiple view camera, a reciprocating carriage frame, a holder thereon carrying a sensitized plate, said holder being slidable vertically on the carriage frame, an escapement mechanism for retaining said plate holder in raised position and permitting intermittent movement of the same in a downward direction, said escapement mechanism comprising a vertically disposed bar arranged on the carriage frame in front of the plate holder and provided with teeth on opposite edges disposed in a staggered arrangement, detent mechanism movable in a vertical direction, and means for actuating said detent mechanism at each end of movement of the carriage, whereby to permit the plate holder to move downwardly the distance of one tooth on the bar.

4. In a multiple view camera, a reciprocating carriage frame, a holder thereon carrying a sensitized plate, said holder being slidable vertically on the carriage frame, an escapement mechanism for retaining said plate holder in raised position and permitting intermittent movement of the same in a downward direction, said escapement mechanism comprising a vertically disposed bar arranged on the carriage frame in front of the plate holder and provided with teeth on opposite edges disposed in a staggered arrangement, a pair of detents movable with the plate holder in a vertical direction and arranged one on each side of the vertical bar for coöperation with the adjacent row of teeth, a carrying member slidable horizontally with respect to the plate holder and on which said detents are mounted and so spaced that when one is in engagement with a tooth the other is out of operative relation with the teeth on its side, and means to engage said detent carrying member at each end of movement of the carriage and sliding the same horizontally, whereby to disengage the supporting detent and position the opposite one where it will engage the next tooth below on its side of the bar.

5. In a multiple view camera, a reciprocating carriage frame, a holder thereon carrying a sensitized plate, said holder being slidable vertically on the carriage frame, an escapement mechanism for retaining said plate holder in raised position and permitting intermittent movement of the same in a downward direction, said escapement mechanism including a bar having a series of arms pivotally mounted at the center thereof on longitudinal axes and movable so as to project at one side or the other of the bar to form teeth, and detent mechanism for coöperation therewith.

6. An escapement mechanism for the purpose described, including a bar, and a series of arms pivotally mounted thereon at the center on longitudinal axes and capable of being individually positioned so as to project at one side or the other of the bar to form teeth.

7. An escapement mechanism for the purpose described, including a bar, a series of arms pivotally mounted thereon at the center on longitudinal axes and capable of being individually positioned so as to project at one side or the other of the bar to form teeth, and means for retaining said arms against swinging movement.

8. An escapement mechanism for the purpose described, including a bar, a rod extending longitudinally thereof, a series of arms pivotally mounted on said rod and individually movable to project at either side of the bar to form teeth, and a hinged plate at the front to lock said arms against swinging movement.

9. In a multiple view camera, a horizontally reciprocating carriage frame, a supplemental frame on the carriage frame slidable vertically, a plate holder carried by the supplemental frame and an escapement means movable with the carriage whereby the plate holder may be successively and intermittently lowered predetermined distances.

10. In a multiple view camera, a horizontally reciprocating carriage frame, a supplemental frame on the carriage frame slidable vertically, a plate holder carried by the supplemental frame, an escapement means movable with the carriage whereby the plate holder may be successively and intermittently lowered predetermined distances and means whereby said escapement mechanism may be actuated by the extreme movement of the carriage.

11. An escapement mechanism for a multiple view camera, comprising a bar adapted to support a photographic plate carriage, teeth formed upon the bar and extending from its opposite edges in staggered relation to each other, and a pair of detents carried by the photographic plate carriage and adapted to successively and alternately encounter the teeth upon the bar to allow the carriage to intermittently move a predetermined distance in relation thereto.

12. In an escapement mechanism for the purpose described, a movable rack bar provided with teeth adapted to be successively engaged by a detent upon a plate-carrying frame and means whereby said rack bar may be detachably secured to allow it to be interchanged with other bars of different pitch.

In testimony whereof I have hereunto set my hand in the presence of two subscribing witnesses.

JAMES W. ANDERSON.

Witnesses:
W. W. HEALEY,
M. E. EWING.